US011671379B1

United States Patent
Wilson et al.

(10) Patent No.: US 11,671,379 B1
(45) Date of Patent: Jun. 6, 2023

(54) SYSTEM AND METHOD FOR SUBSCRIPTION MANAGEMENT USING DYNAMICALLY COMPOSED MANAGEMENT ENTITIES

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 17/570,697

(22) Filed: Jan. 7, 2022

(51) Int. Cl.
*H04L 47/80* (2022.01)
*H04L 47/762* (2022.01)
*H04L 47/70* (2022.01)

(52) U.S. Cl.
CPC .......... *H04L 47/808* (2013.01); *H04L 47/762* (2013.01); *H04L 47/801* (2013.01); *H04L 47/828* (2013.01); *H04L 47/829* (2013.01)

(58) Field of Classification Search
CPC .......... G06F 9/441; G06F 9/4411; G06F 8/65; G06F 12/0646
See application file for complete search history.

(56) References Cited

U.S. PATENT DOCUMENTS

| 9,529,602 B1 * | 12/2016 | Swierk | G06F 9/45558 |
| 2011/0225574 A1 * | 9/2011 | Khalidi | G06F 8/656 717/168 |
| 2019/0018715 A1 * | 1/2019 | Behrendt | G06F 8/71 |

OTHER PUBLICATIONS

Souvik Chakravarty (2019). Arm System Control Processor (SCP) Firmware-101. Linaro. https://static.linaro.org/connect/san19/presentations/san19-117.pdf.
"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

* cited by examiner

*Primary Examiner* — Douglas B Blair
(74) *Attorney, Agent, or Firm* — Womble Bond Dickinson (US) LLP

(57) ABSTRACT

Methods, systems, and devices for providing computer implemented services using managed systems are disclosed. To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services. To improve the likelihood of the computer implemented services being provided, the managed systems may be managed using a subscription based model. The subscription model may utilize a highly accessible service to obtain information regarding desired capabilities (e.g., a subscription) of a managed system, and use the acquired information to automatically configure and manage the features and capabilities of the managed systems by powering and depowering select components as well as deploying dynamically composed management entities.

20 Claims, 14 Drawing Sheets

Subscription Information Repository 164

Entry A 180

| Subscription Identifier 182 | Subscription Limitations 184 | One or More Actions 186 |

•
•
•

Entry N 188

FIG. 1D

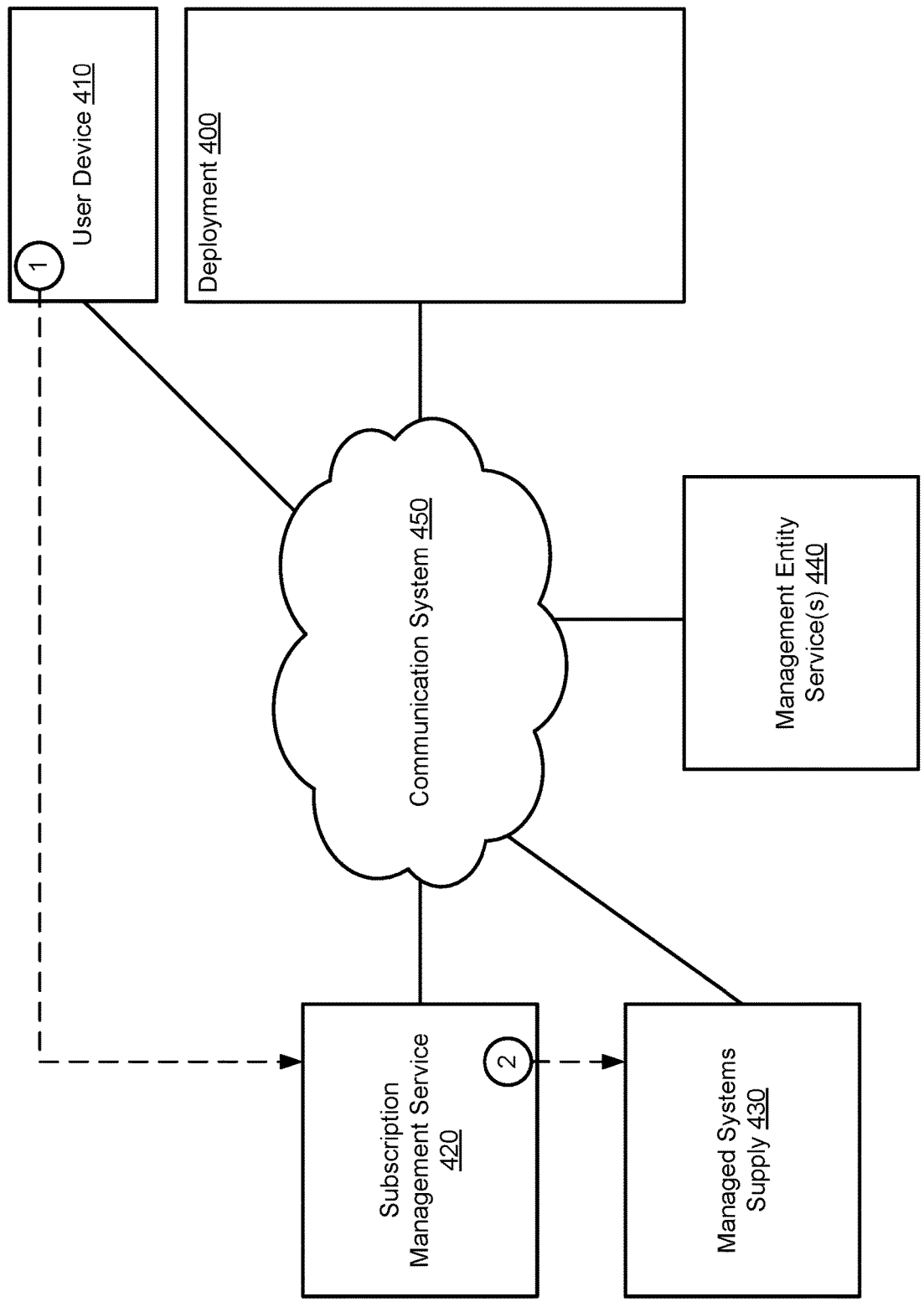

SYSTEM AND METHOD FOR SUBSCRIPTION MANAGEMENT USING DYNAMICALLY COMPOSED MANAGEMENT ENTITIES

FIELD DISCLOSED HEREIN

Embodiments disclosed herein relate generally to system management. More particularly, embodiments disclosed herein relate to systems and methods to manage systems through dynamic deployment of management entities.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIG. 1D shows a block diagram illustrating a subscription information repository in accordance with an embodiment.

FIGS. 4A-4E show diagrams illustrating interactions between and actions of components of a system in accordance with an embodiment.

DETAILED DESCRIPTION

Figure 1A:
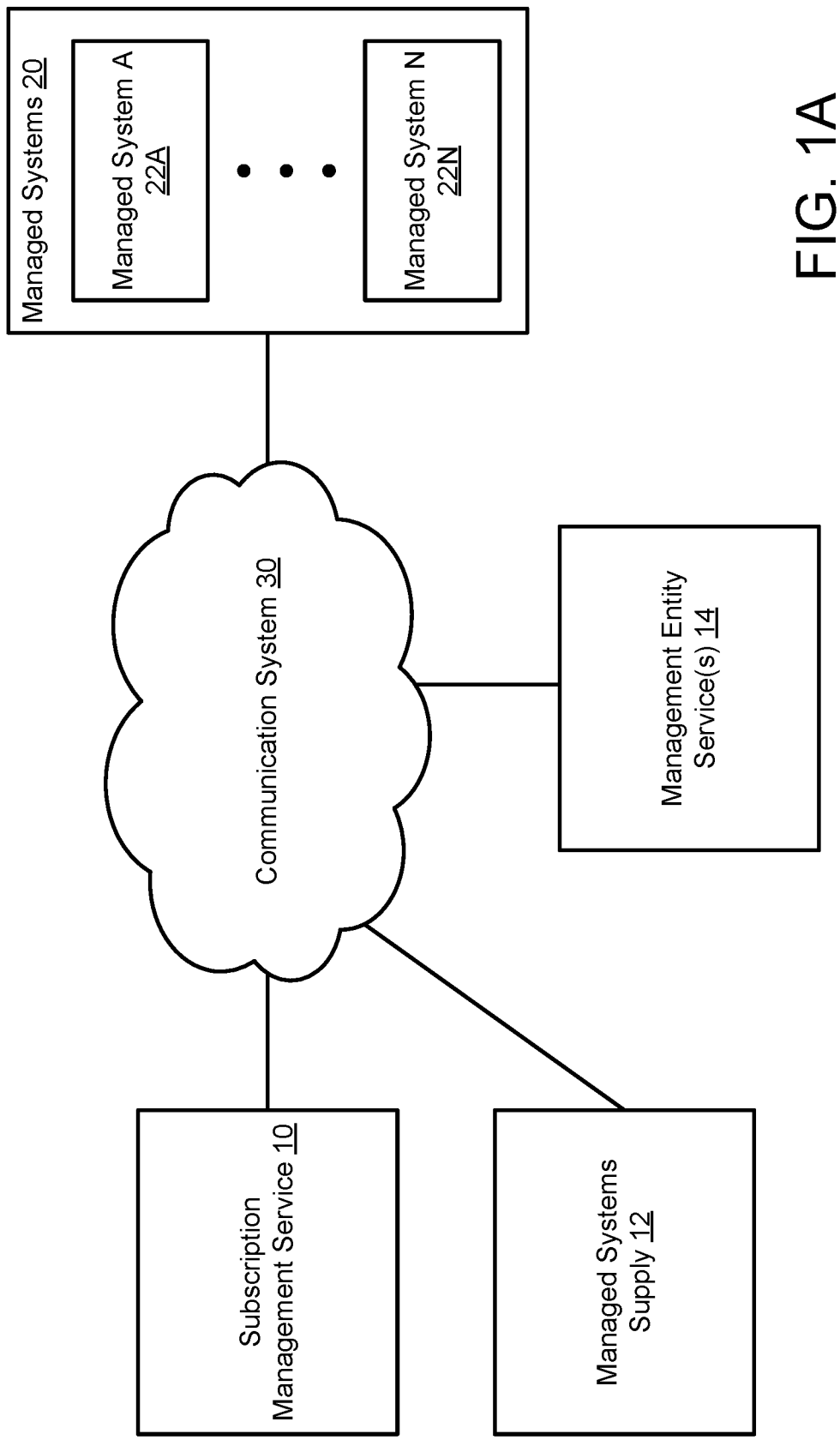
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources and also software resources such as drivers, firmware, etc. to provide the desired computer implemented services. Different computer implemented services may have different hardware and/or software resources needs.

To improve the likelihood of the computer implemented services being provided, embodiments disclosed here relate to methods and systems for managing managed systems using a subscription based model. The subscription model may utilize a highly accessible service to obtain information regarding desired capabilities (e.g., a subscription) of a managed system, and use the acquired information to automatically configure and manage the features and capabilities of managed systems to meet those desired by users, operators, and/or other persons.

Additionally, the subscription model may provide for the automatic removal and/or disablement of functions and/or capabilities upon subscription limits being exceeded. The managed systems may host local subscription managers that include functionality to automatically enable and disable various components, to add and/or remove various software components, and/or otherwise manage the operation of the host devices. Consequently, the managed system may automatically be placed into compliance with subscriptions by the local subscription managers even under challenging circumstances such as, for example, limited and/or no communications with the subscription management service.

In an embodiment, the managed systems are managed by selectively powering and/or depowering some of the hardware resources of the respective managed systems to match corresponding subscriptions. Powering and/or depowering of the hardware resources may allow quantities of hardware resources corresponding to those subscribed to by a user of the managed systems to be utilized by the users of the managed systems.

In an embodiment, the hardware resources are managed by dynamically modifying the management entity used to present resources to applications hosted by the managed systems that provide the computer implemented services. For example, over time the types of computer implemented services to be provided by the managed systems may change. In response, management entity subscriptions for the managed systems may be updated to reflect the management entities necessary to provide the changed computer implemented services. In response to the changed management entity subscriptions, the local subscription managers of the managed systems may automatically and dynamically instantiate boot images or other types of data structures. The dynamically instantiated data structures may be used to hand off operation of the managed systems to corresponding management entities. In this manner, subscription based management of management entities for managed systems may be provided.

Consequently, the managed systems may be more likely to be able to provide the computer implemented services over time by virtue of the seamless and automatic compliance with the corresponding subscriptions associated with the managed systems, and software components hosted thereon.

In an embodiment, a computer-implemented method for operating a managed system is provided. The method may include obtaining, by a local subscription manager of the managed system, a subscription update for the managed system; making a determination that the subscription update is a valid subscription update; in response to the determination: updating, by the local subscription manager, a subscription information repository based on the subscription update to obtain an updated subscription information repository, the subscription information repository specifying a management entity for the managed system to which management of the managed system is to be handed off following startup; and enforcing, by the local subscription manager, the updated subscription information repository on the managed system by dynamically composing the management entity and initiating execution of the dynamically composed management entity following the startup.

Dynamically composing the management entity may include identifying the management entity based on the updating of the subscription information repository; obtaining one or more support entities for the management entity; and generating a data structure using the one or more support entities and the management entity.

Initiating execution of the dynamically composed management entity may include loading, at least in part, a portion of the data structure into memory of the managed system; and initiating execution of a portion of computer instructions stored in the data structure.

Obtaining the one or more support entities may include requesting at least one of the one or more support entities from a management entity service that is remote to the managed system; and receiving an image of the at least one of the one or more support entities via a communication between the local subscription manager and the management entity service.

The data structure may be an image (e.g., software image, data structure) comprising executable computer code and at least one in-memory data structure.

The executable computer code may correspond to an operating system that serves as the management entity. The executable computer code also corresponds to a driver adapted to facilitate use of hardware resources of the managed system by the operating system.

The management entity may be dynamically composed prior to initiating of a startup of the managed system.

The management entity may be dynamically composed during the startup of the managed system, and the startup of the managed system may be interrupted during the dynamic composition of the management entity.

The local subscription manager may include a computing device hosted by the managed system and that operates independently from the managed system.

A non-transitory media may include instructions that when executed by a processor cause the computer-implemented method to be performed.

A managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
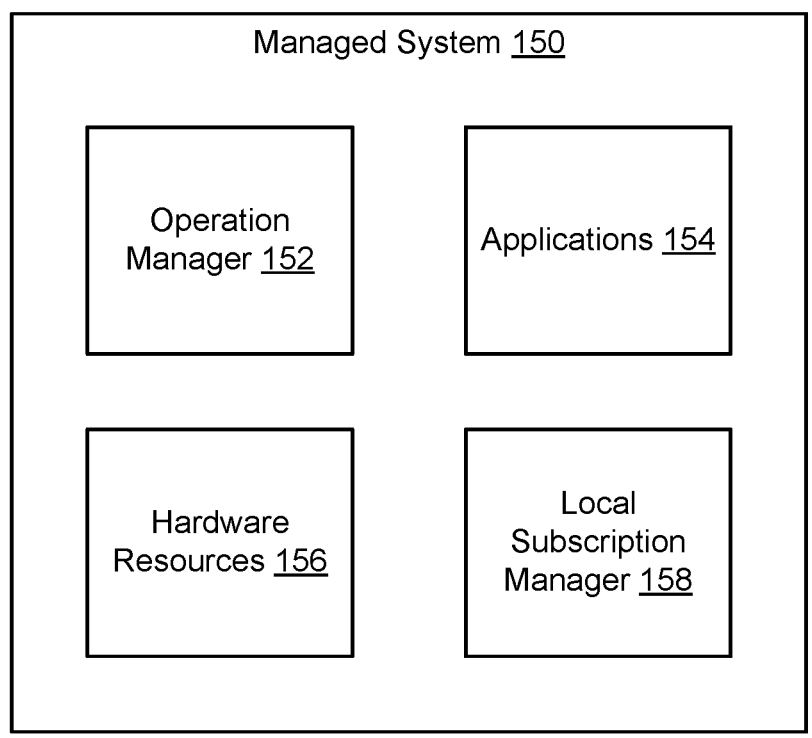
FIG. 1B shows a block diagram illustrating a managed system in accordance with an embodiment.

To provide the aforementioned computer implemented services, any of the managed systems 22A, 22N may need to operate in a predetermined manner. For example, certain hardware components may need to be operational and/or certain software components may need to be operating for the managed systems to provide computer implemented services (e.g., to operate as a solution). Different configurations of the hardware components, software components, and/or applications may need to be implemented by managed systems 20 depending on the computer implemented services desired to be provided by the respective managed systems. Refer to FIG. 1B for additional details regarding managed systems 20.

However, determining these configurations of hardware and/or software components (e.g., applications) necessary for corresponding computer implemented services to be provided by the managed systems may be technically challenging to identify. For example, a person may need to be familiar with a range of hardware and software components issues to effectively select the hardware components and/or software components of a system so that the system is capable of providing the desired computer implemented services. Further, if a system is procured that lacks necessary hardware and/or software components, the procured system may not be able to provide its desired functions.

In general, embodiments disclosed herein relate to system, devices and methods for managing one or more managed systems in a manner that may improve the likelihood of the managed system being able to provide desired computer implemented services over time. To do so, a system in accordance with embodiments disclosed herein may provide a distributed system for automatically identifying and implementing hardware and/or software configurations of managed systems (e.g., to provide an integrated solution). By doing so, embodiments disclosed herein may (i) reduce the cognitive burden for selecting and managing systems to provide desired computer implemented services, (ii) may improve the uptime of desired computer implemented services by making it more likely that managed systems are able to provide the desired services over time, and/or (iii) reducing the cost of obtaining desired computer implemented services by dynamically enabling and/or disabling only those functions/components (which may have associated cost for such functions) necessary to provide the desired computer implemented services.

To provide the above noted functionality, a system in accordance with an embodiment may include subscription management service 10. Subscription management service 10 may facilitate (i) selection and procurement of managed system to a client site (e.g., a deployment location), and (ii) automatic configuration of managed systems 20 to provide an integrated solution. To do so, subscription management service 10 may (i) obtain information indicating desired functions of one or more of managed systems 20 and/or hardware components of managed systems 20 to be enabled and/or disabled (and/or information indicating corresponding periods of time of enablement/disablement of hardware/software components), (ii) select and deploy one or more managed systems 20 to a client site, (iii) correlate the desired functions with various hardware components (e.g., if explicit hardware components identifications are not made) and/or software components (e.g., operating systems, applications, etc.), and (iv) provide local subscription managers hosted by managed systems 20 with information regarding the identified hardware/software components, periods of enablement/disablement, and/or other information to allow the local subscription managers to configure managed systems 20 in a manner that conforms to the information (e.g., subscriptions) obtained by subscription management service 10. In this manner, a user or manager of managed systems 20 may obtain and configure managed systems 20 without needing to directly know specific capabilities of potential managed systems and/or interact with the various hardware and/or software components of managed systems 20 once deployed to a client site.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities than those required to immediately address a request from the requesting entity. The selection may be made on the basis that the requesting entity may be likely to request additional features and/or capabilities in the future. Consequently, managed systems 20, when deployed to a client site, may include sufficient hardware components to address a range of different use cases and solutions, beyond those that may be immediately apparent to a requesting entity. The additional capabilities may take the form of, for example, additional processors, memory modules, storage devices, graphical processing units, network interface devices, and/or other types of hardware components. Likewise, compatibility with various types of software components may be taken into account such that a range of different software components may be dynamically deployed to managed systems 20 over time (e.g., based on changing uses of managed systems 20).

The distributed system may allow a provider of managed systems 20 to selectively manage various functionalities provided by managed systems 20. By doing so, a provider of managed systems 20 may tailor the functions provided by managed systems 20 (e.g., from all possible functions) to only those requested, desired, and/or procured by an operator, manager, and/or user of managed systems 20. In this manner, the additional capabilities not requested by a requesting entity may be disabled from use by a use of managed systems 20, until such time as the requesting entity adds or otherwise changes subscriptions such that the additional capabilities are to be afforded to the users of managed systems 20.

For example, consider a scenario where a provider of a managed system does so on a contractual basis where a user of the managed system agrees to purchase subscriptions for various functionalities, hardware components, and/or software components. The user may use subscription management service 10 to select to which of the aforementioned features the user wishes to have enabled, to the extent of such enablement, durations of enablement, etc. After an initial selection leading to deployment of managed systems 20 with additional capabilities beyond those usable by the user, the user may expand or modify their subscription to allow for use of these additional capabilities. In response, subscription management service 10 may cooperate with local subscription managers hosted by managed systems 20 to reconfigure the operation of managed systems 20 to allow these additional features to be utilized by the users. Consequently, the underlying hardware of managed systems 20 may not need to be changed to allow for various capabilities of managed systems 20 available to user to be expanded or contracted, depending on whether a corresponding subscription is expanded or contracted. Likewise, the software components hosted by the managed systems 20 may be dynamically changed over time to match those software components subscribed to for the managed systems 20.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client/user devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information).

Likewise, for changes in subscription for software components, subscription management service 10 may provide, for example, information regarding (i) where copies of the software components may be obtained, (ii) information regarding dependencies of the software components, and/or (iii) information usable to resolve the dependencies (e.g., such as locations of where drivers or other types of support entities may be obtained). For example, any number of support entities may be hosted by management entity service 14. Management entity service 14 may include any number of repositories and/or other data structures in which various support entities (e.g., executable code, in-memory data structures, etc.) are stored and accessible to the local subscription managers. The local subscription managers of managed systems 20 may use the aforementioned information to dynamically modify the software components hosted by managed systems 20 over time to comply with the subscriptions maintained by subscription management service 10.

Any of subscription management service 10, managed systems supply 12, management entity services 14, and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

In an embodiment, one or more of subscription management service 10, managed systems supply 12, management entity services 14, and managed systems 20 are operably connected via communication system 30. Communication system 30 may allow any of subscription management service 10, managed systems supply 12, management entity services 14, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 6), a public network, and/or may include the Internet. For example, managed systems 20 may be operably connected to subscription management service 10 via the Internet. Subscription management service 10, managed systems supply 12, management entity services 14, managed systems 20, and/or communication system 30 may be adapted to perform one or more protocols for communicating via communication system 30.

While illustrated in FIG. 1 with a limited number of specific components, a system may include additional, fewer, and/or different components without departing from embodiments disclosed herein.

Turning to FIG. 1B, a block diagram illustrating managed system 150 in accordance with an embodiment is shown. Managed system 150 may be similar to any of managed systems 20 shown in FIG. 1A. Managed system 150 may provide desired computer implemented service by allowing for its automatic reconfiguration over time based on subscriptions maintained by subscription management service 10, shown in FIG. 1A. Managed system 150 may be reconfigured by, for example, (i) enabling or disabling use of one or more of hardware resources 156 by users of managed system 150, and/or (ii) removing, modifying, and/or adding software components hosted by hardware resources 156.

Figure 6:
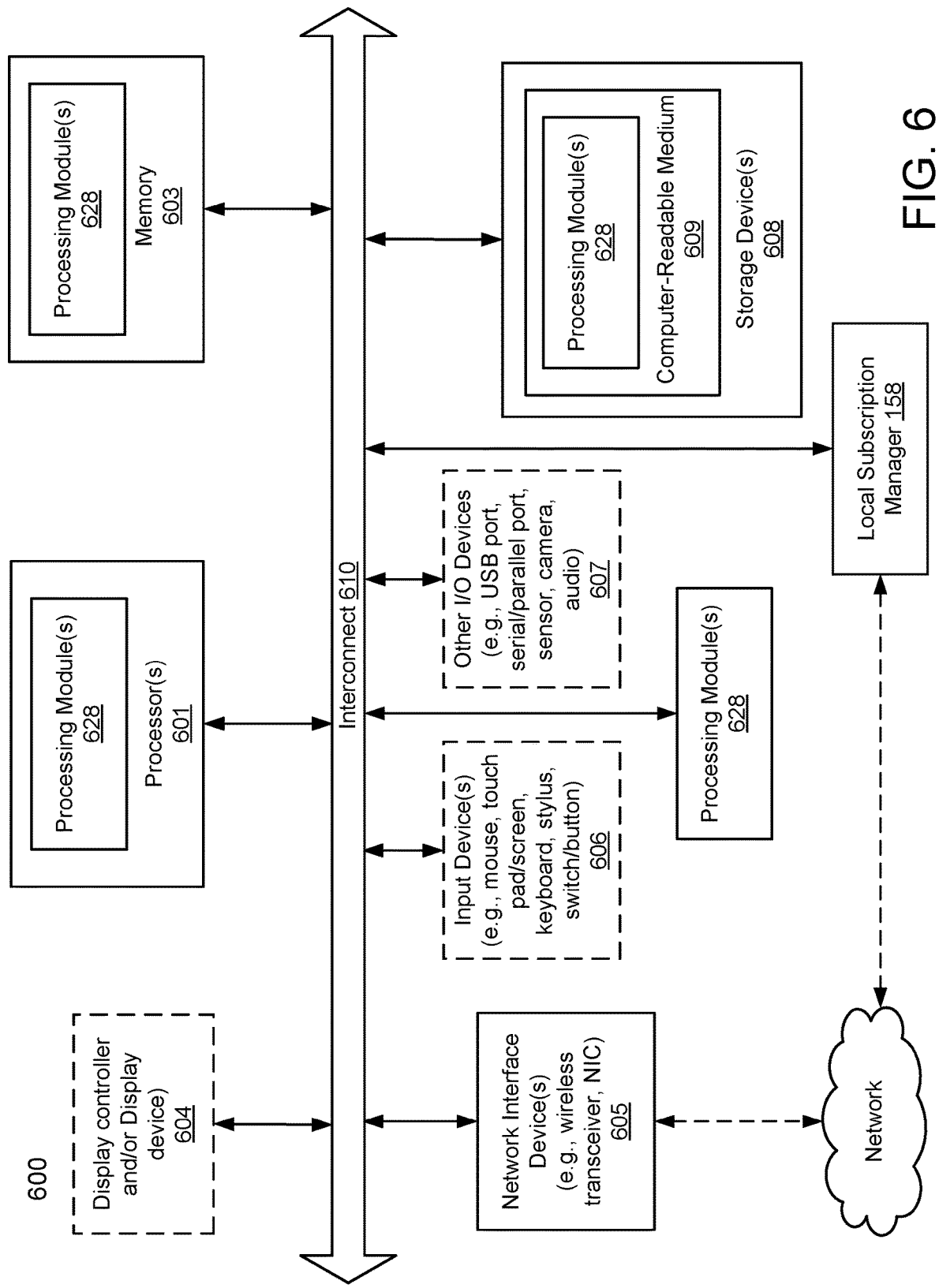
FIG. 6 shows a block diagram illustrating a computing device in accordance with an embodiment.

In addition (and/or alternatively) to any of the components shown in FIG. 6, managed system 150 may include operation manager 152, applications 154, hardware resources 156, and local subscription manager 158. Each of these components is discussed below.

Operation manager 152 may generally manage operation of the component of managed system 150, except for local subscription manager 158. For example, operation manager 152 may be implemented with an operating system used to manage hardware resources 156 of managed system 150 to facilitate execution of applications 154. Operation manager 152 may also include, for example, a startup manager such as a basic input output system (BIOS) used to prepare managed system 150 to boot to an operating system, drivers, and/or other types of operation management entities. For example, the startup manager may perform various administrative functions such as (i) identifying the hardware resource 156 and (ii) preparing the hardware resources 156 for use. Once prepared, the startup manager may handoff management of managed system 150 to the operating system or other type of management entity to place managed system 150 in a predetermined operating system conducive to applications 154 providing their functionalities. Prior to hand off, managed system 150 may not be in an operating state in which applications 154 may provide all, or a portion, of their functionalities.

To facilitate dynamic changes in the function of operation manager 152 and/or applications 154, local subscription manager 158 may manage the startup process in a manner that allows for these entities to be dynamically reconfigured, changed, and/or otherwise operationally modified (e.g., even replaced). The aforementioned process is discussed in greater detail below.

Applications 154 may provide all, or a portion, of the computer implemented services desired by a user, operator, or other person associated with managed system 150. Applications 154 may utilize hardware resources 156 to provide their respective functionalities. Operation manager 152 may mediate presentation of hardware resources 156 by, for example, scheduling use, managing discontinuous access, and/or performing other actions to coordinate use of hardware resources 156 by applications 154 (and/or other entities). Consequently, the operation of applications 154 may be predicated on the operation of operation manager 152.

In an embodiment, one or more of operation manager 152 and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 152 and applications 154. One or more of operation manager 152 and applications 154 may be implemented using other types of hardware devices without departing embodiment disclosed herein.

In an embodiment, one or more of operation manager 152 and applications 154 is implemented using a processor adapted to execute computing code stored on a persistent storage that when executed by the processor performs the functionality of one or more of operation manager 152 and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of operation manager 152, applications 154, and/or other entities not shown in FIG. 1B. As part of their respective operation, hardware resources 156 may host firmware and/or may otherwise be programmable to facilitate their respective operation.

Local subscription manager 158 may provide subscription management services. Subscription management services may include (i) obtaining information regarding subscriptions, (ii) performing one or more actions to implement the subscriptions, (iii) storing information regarding the subscriptions in a location accessible to local subscription manager 158, (iv) monitoring operation of managed system 150 based on subscription information (e.g., specified by the information regarding the subscriptions), and (v) based on the monitoring, performing one or more actions to force managed system 150 to comply with the subscriptions (or lack thereof) once managed system 150 may in the future and/or is currently exceeding one or more subscription limitations. The one or more actions to implement the subscriptions may include, for example, (a) activating or deactivating portions of hardware resources 156, (b) loading various information into storage and/or memory of managed system 150 (e.g., such as during startup to dynamically configure a management entity to which operation of managed system 150 will be handed off, (c) causing processors or other devices of hardware resources 156 to execute various software instructions to cause managed system 150 to perform various actions such as beginning operation of a dynamically composed management entity, and/or (d) any other types of actions to implement changes to managed system 150 to comply with a subscription.

By providing its functionality, local subscription manager 158 may manage the configuration, behavior, and/or functionality of managed system 150 in a manner that automatically conforms it to match that expected by subscription management service 10. As part of the aforementioned process, local subscription manager 158 and subscription management service 10 may cooperate to enforce subscriptions on managed system 150. Local subscription manager 158 and subscription management service 10 may also perform one or more authentications of one another and/or communications from these components to prevent other entities from interfering with the cooperative operation of local subscription manager 158 and subscription management service 10.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 610, shown in FIG. 6), and may operate independently from other components (e.g., hardware and software) of managed system 150. The management controller may include functionality to manage the operation, configuration, and/or other characteristic of any hardware and/or software component of managed system 150. For example, the management controller may include functionality to interrupt/suspend a startup process to allow it to dynamically configure a management entity and initiate execution of the dynamically configured management entity.

In an embodiment, the management controller includes a separate communication interface (e.g., from that of a communication interface of managed system 150) through which it communicates with subscription management service 10. In an embodiment, the management controller uses the same communication interface which managed system 150 uses to communicate with other devices. Either of these communication interface may facilitate communications with communication system 30, and devices connected to communication system 30 such as subscription management service 10.

Figure 1C:
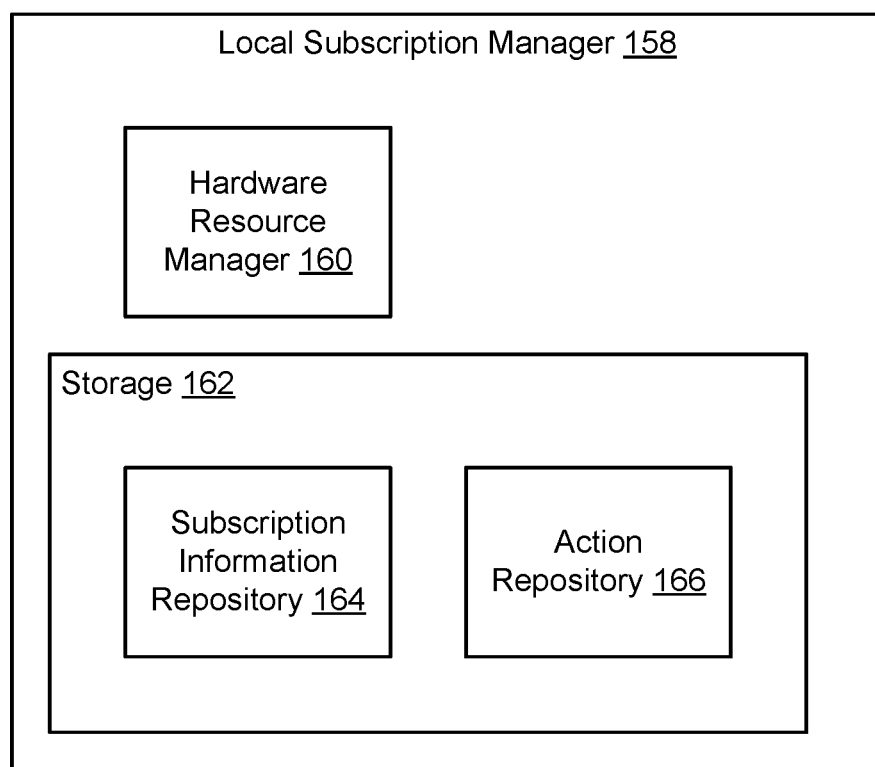
FIG. 1C shows a block diagram illustrating a local subscription manager in accordance with an embodiment.

When providing its functionality, local subscription manager 158 may perform all, or a portion, of the methods and operations illustrated in FIGS. 2-5. Refer to FIG. 1C for additional details regarding local subscription manager 158.

While illustrated in FIG. 1B with a limited number of specific components, a managed system may include additional, fewer, and/or different components without departing from embodiments disclosed herein.

Turning to FIG. 1C, a block diagram of local subscription manager 158 in accordance with an embodiment is shown. Local subscription manager 158 may be implemented with a computing device similar to that illustrated in FIG. 6. In addition (and/or alternatively) to any of the components shown in FIG. 6, local subscription manager 158 may include hardware resource manager 160 and storage 162. Each of these components is discussed below.

Hardware resource manager 160 may include functionality to (i) establish secure connections with and/or authenticate subscription management service 10, (ii) obtain information from subscription management service 10 via the secure connections, (iii) update subscription information repository 164 and/or action repository 166 based on the obtained information, and (iv) modify the configuration, function, and/or operation of a managed system that hosts local subscription manager 158 to conform to the information stored in subscription information repository 164 and/or action repository 166. To modify the configuration, function, and/or operation of a host managed system, hardware resource manager 160 may selectively activate/deactivate hardware resources of the host managed system (e.g., for/from use by users) and (ii) modify the operation of management entities hosted by the host managed system. Doing so may limit or expand the hardware resources as well as management entity functionality available for use by a user of the host managed system in a manner that complies with the information in subscription information repository 164.

In an embodiment, hardware resource manager 160 is implemented using a hardware device including circuitry. The hardware device may be, for example, a digital signal processor, a field programmable gate array, or an application specific integrated circuit. The circuitry may be adapted to cause the hardware device to perform the functionality of hardware resource manager 160. Hardware resource manager 160 may be implemented using other types of hardware devices without departing embodiment disclosed herein.

In one embodiment, hardware resource manager 160 is implemented using a processor adapted to execute computing code stored on a persistent storage that when executed by the processor performs the functionality of hardware resource manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a device that hosts local subscription manager 158.

Storage 162 may store data structures including subscription information repository 164 and action repository 166.

Subscription information repository 164 may be implemented with one or more data structures that store information regarding subscriptions for a device that hosts local subscription manager 158. Refer to FIG. 1D for additional details regarding subscription information repository 164.

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by hardware resource manager 160 when a condition is met, such as a subscription limit being exceeded or a new subscription being obtained.

In an embodiment, action repository 166 includes at least one set of actions keyed to changes in subscription of a management entity for the host managed system. The actions may include (i) restarting/initializing a host managed system, (ii) after doing so, interrupting a normal startup process performed by the host managed system prior to the host managed system booting to a management entity, (iii) while the normal startup process is interrupted, dynamically configuring a management entity, and/or (iv) resuming the normal startup process such that the host managed systems hands off, after startup, operation of the managed system to the dynamically configured management entity. In this manner, the management entity utilized by a host managed system may be dynamically changed over time to meet the needs of users of the host managed system.

While various data structures have been illustrated and described in FIG. 1C, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1C may be stored remotely to local subscription manager 158 (e.g., in a storage of a host device, a cloud resource, etc.) in a manner that is still accessible to local subscription manager 158.

While illustrated in FIG. 1C with a limited number of specific components, a local subscription manager may include additional, fewer, and/or different components without departing from embodiments disclosed herein.

Turning to FIG. 1D, a diagram of subscription information repository 164 in accordance with an embodiment is shown. When information regarding subscriptions is obtained by a local subscription manager, subscription information repository 164 may be updated to reflect the information. For example, the local subscription manager may (if the information so indicates) perform actions to modify a host management system (e.g., adding or removing functionality, access to various components, etc.) and add information to subscription information repository 164 such that limitations on a subscription may be identified and changes to implement the subscription may be reverted upon subscription limits being exceeded.

Subscription information repository 164 may include any number of entries 180, 188. Each of entries 180, 188 may correspond to a different current subscription. Each of entries 180, 188 may include a subscription identifier 182, subscription limitations 184, and one or more actions 186.

Subscription identifier 182 may identify to which subscription an entry corresponds. For example, subscription identifier 182 may be implemented with numerical identifiers (e.g., 1, 2, 3 . . . ). These integers may correspond with similar information maintained by the subscription management service such that common entries associated with the same subscription may be easily identifiable.

Subscription limitations 184 may specify one or more limitations (if any exist, in some cases no limitations may exist if a feature/function/component is enabled forever without limitation) regarding a subscription identified by subscription identifier 182. Subscription limitations 184 may specify, for example, time limits, expiration points in time, operational use limits (e.g., such as numbers of operations a graphic processor, accelerator, or other device may perform), and/or other information regarding limits on a subscription. Different subscriptions may have different subscription limitations (e.g., may expire at different times) The operation of a host system may be compared to the information in subscription limitations 184 to ascertain whether a subscription limitation has been exceeded.

One or more actions 186 may specify actions to be performed upon a subscription limit specified by subscription limitations 184 being exceeded. The actions may include, for example, disabling software/hardware components, modifying a configuration of a software/hardware component, etc.

In an embodiment, the one or more actions 186 include one or more executable (e.g., by a processor) code blocks. The code blocks, when executed, may cause actions to be performed that may cause changes made to a host managed system when a subscription is initiated to be reverted or to otherwise remove features, functions, and/or other aspects of a subscription that is no longer in force (e.g., when a subscription limit is exceeded).

In an embodiment, the one or more actions 186 may include one or more references to actions stored in action repository 166 such that various actions specified by action repository 166 may be aggregated and performed. Like action repository 166, one or more actions 186 may specify actions which when performed modify subsequent operation of the host managed system.

Subscription information repository 164 may include any number of entries, with each entry specifying similar and/or different information.

Like the information in subscription information repository 164, a subscription management service may store similar information. However, in addition to the information included in the entries shown in FIG. 1D, the information stored by the subscription management system may include two different sets of one or more actions. A first set of the one or more actions may cause (when the first set of actions are performed) a feature, function, and/or other aspect of a host device to be modified such that the host device is able to provide features/functionalities associated with the subscription. For example, a first set of one or more actions may include dynamically configuring and beginning execution of a management entity by the host managed system. A second set of the one or more actions may cause (when the second set of actions are performed) a feature, function, and/or other aspect of a host device to be modified such that the host device is not able to provide features/functionalities associated with the subscription. For example, a second set of one or more actions may include disabling a previously hosted management entity.

In an embodiment, the management entity includes an operating system and one or more drivers. The management entity may be dynamically configured by obtaining a copy of the operating system (e.g., a management entity) and the drivers (e.g., support entities), and using them to create an image to which a managed system may be booted. The management entity may be dynamically configured prior to and/or as part of a startup of the managed system.

While illustrated in FIG. 1D with a limited number of specific components, a subscription information repository may include additional, fewer, and/or different components without departing from embodiments disclosed herein.

While FIGS. 1A-1D have been illustrated using blocks representing different entities, the functionality (all, or a portion) of any of these entities may be combined with any of the other illustrated entities. Likewise, the functionality (all, or a portion) of any of these entities may be divided across any number of entities (e.g., in addition to those illustrated in and/or described with respect to these figures).

Figure 2:
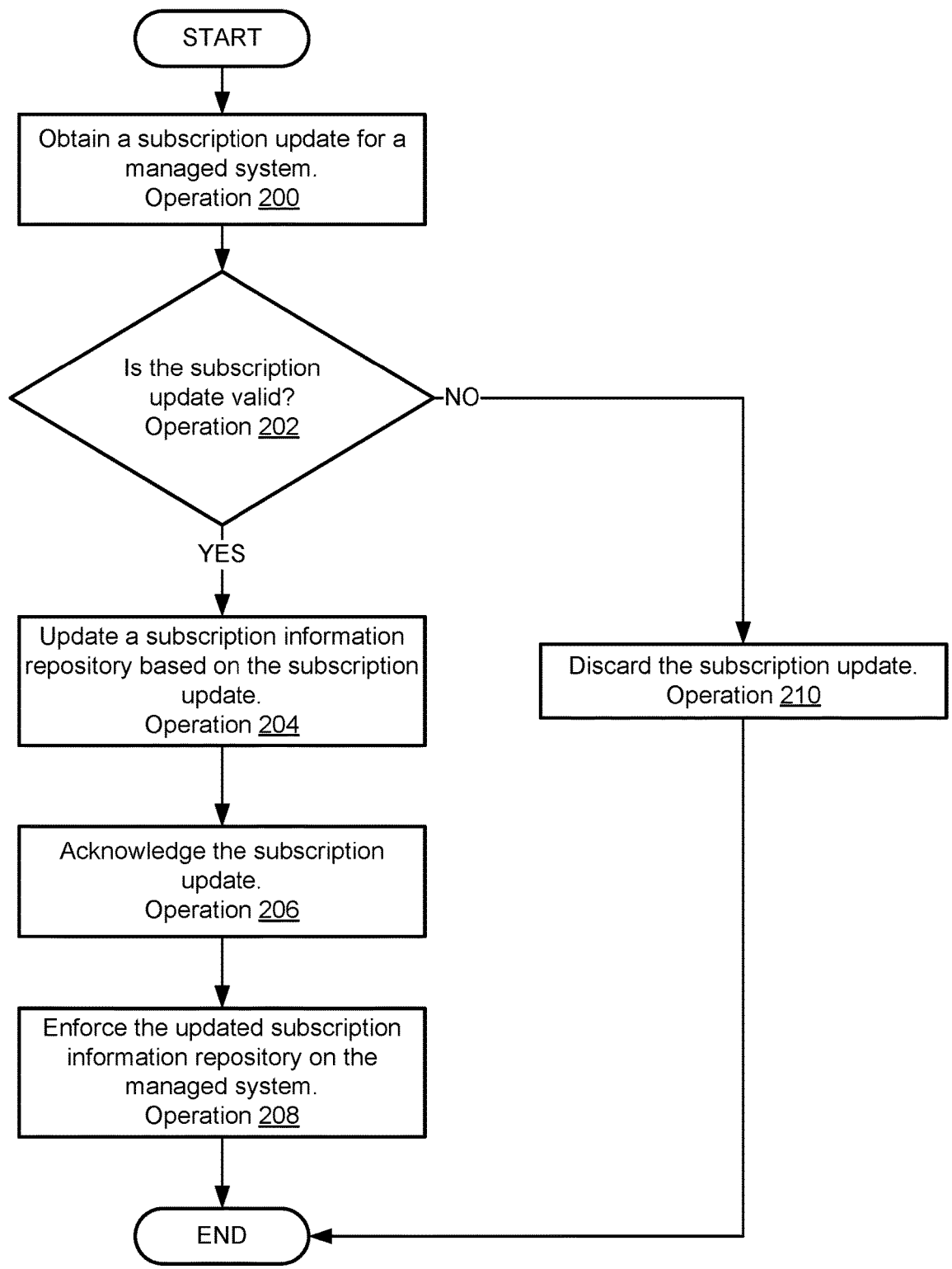
FIG. 2 shows a flow diagram illustrating a method of processing a subscription update in accordance with an embodiment.

As discussed above, the components of FIG. 1A may perform various methods to provide computer implemented services using managed systems. FIGS. 2-3 illustrate examples of methods that may be performed by the components of FIG. 1A. For example, a local subscription manager of a managed system may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of processing a subscription update in accordance with an embodiment is shown. The method illustrated in FIG. 2 may be performed when a person changes a subscription associated with a managed system. For example, a person may utilize the subscription management service 10 to change an operating system to which a managed system is subscribed to modify the capabilities of the managed system. Doing so may prompt the subscription management service 10 to generate and provide the subscription update to the managed system.

At operation 200, a subscription update for a managed system is obtained from a subscription management system. The subscription update may be obtained by a local subscription manager. For example, the subscription update may be obtained by receiving it in a message from the subscription management service via a communication system. The subscription update may be obtained via other methods (e.g., publish-subscribe systems, pull rather than push, etc.) without departing from embodiments disclosed herein.

In an embodiment, the subscription update specifies (i) a subscription identifier, (ii) one or more subscription limitations, (iii) one or more subscription enablement actions (e.g., and/or identifiers usable to index to various actions in an action repository), and (iv) one or more subscription disablement actions (e.g., and/or identifiers usable to index to various actions in an action repository).

In an embodiment, the subscription enablement actions including (i) dynamically configuring a management entity of the host managed system during a startup and (ii) directing the host managed system to hand off management of its operation to the dynamically configured management entity. To provide for dynamic configuration, the enablement actions may include (i) obtaining a copy of a management entity, (ii) obtaining copies of support entities for the management entity, (iii) generating a bootable image using the obtained management and support entities, and (iv) booting the host managed system to a management entity using the bootable image. The enablement actions may be performed prior to and/or as part of a startup of the host managed system.

At operation 202, it is determined whether the subscription update is valid. A subscription update may be considered valid when it can be determined that a subscription management system (e.g., tasked with managing a host managed system which hosts a local subscription manager performing all, or some, of the method illustrated in FIG. 2) generated, provided, and/or otherwise originated the subscription update (e.g., and/or the contents of the subscription update can be authenticated). The determination may be made via any method without departing from embodiments disclosed herein.

For example, in an embodiment, the determination may be made by determining whether the subscription update includes authentication data (e.g., such as a bearer token) usable to ascertain whether the subscription update was originated by the subscription management service. If such information is included in, with, and/or otherwise associated with the subscription update, then the subscription update may be determined as being valid.

In another example, in an embodiment, the determination may be made by checking with the subscription management service. For example, the local subscription manager may establish a secure communication channel (e.g., via a public-private key exchange and negotiated session key for securing communications between these components) with the subscription management service through which information may be exchanged. The information may include, for example, portions of the subscription update, information derived from the subscription update, some authentication data in and/or associated with the subscription update, and/or other types of information usable by the subscription management service to determine whether it originated the subscription update. If the subscription management service determines that it originated the subscription update, then the subscription management service may determine that the subscription update is valid and notify the local subscription manager of the determination.

If it is determined that the subscription update is valid, then the method may proceed to operation 204. Otherwise, the method may proceed to operation 210 following operation 202.

At operation 204, a subscription information repository is updated based on the subscription update. The subscription information repository may be updated by, for example, adding a new entry indicating a new subscription, removing an entry indicating termination of a subscription, and/or modifying an entry indicating a change in the subscription. In this manner, the information included in subscription information repository may be updated to allow for the host managed system to be dynamically configured to meet subscription limitations. An updated subscription information repository may be obtained by updating the subscription information repository.

At operation 206, the subscription update is acknowledged. The subscription update may be acknowledged by, for example, sending a message (and/or using other mechanisms to provide information) to an entity (e.g., a subscription management service tasked with managing the host managed system) associated with the subscription update. The message may indicate, for example: (i) that the host managed system is in compliance with subscription maintained by the subscription management service, (ii) changes made to the operation of the host managed system to comply with the subscription update, (iii) any information indicating deviation or inability to comply with the subscription update, and/or (iv) other types of information usable by the subscription management service to manage the host managed system to comply with the subscriptions associated with the host managed system.

In an embodiment, the subscription update is acknowledged before the host managed system is placed into compliance with the subscription update even while the acknowledgement indicates that the host managed system is in compliance with the subscription update, and subscriptions maintained by a subscription management service. Thus, there may be a discrepancy between the operation of the host managed system and the subscriptions maintained by the subscription management service.

At operation 208, the updated subscription information repository is enforced on the host managed system. The updated subscription information repository may be enforced by, for example, selectively powering and depowering hardware resources of the host managed system, dynamically configuring and deploying management entities, and/or performing other actions necessary to conform the operation of the host managed system to the subscriptions specified by the updated subscription information repository.

In an embodiment, the powering/depowering of the hardware resources are performed in manner that disguises the presence of depowered hardware resources from management entities of the host managed system. Consequently, the depowered hardware resources may not be utilized by users of the host managed system.

Enforcing the updated subscription information repository may be performed while, for example, the local subscription manager is unable to communicate with the subscription management service. Consequently, users of the host managed system may be unable to prevent various subscriptions from being enforced on the hosted managed system by, for example, disconnecting the host managed system from the Internet.

Figure 3A:
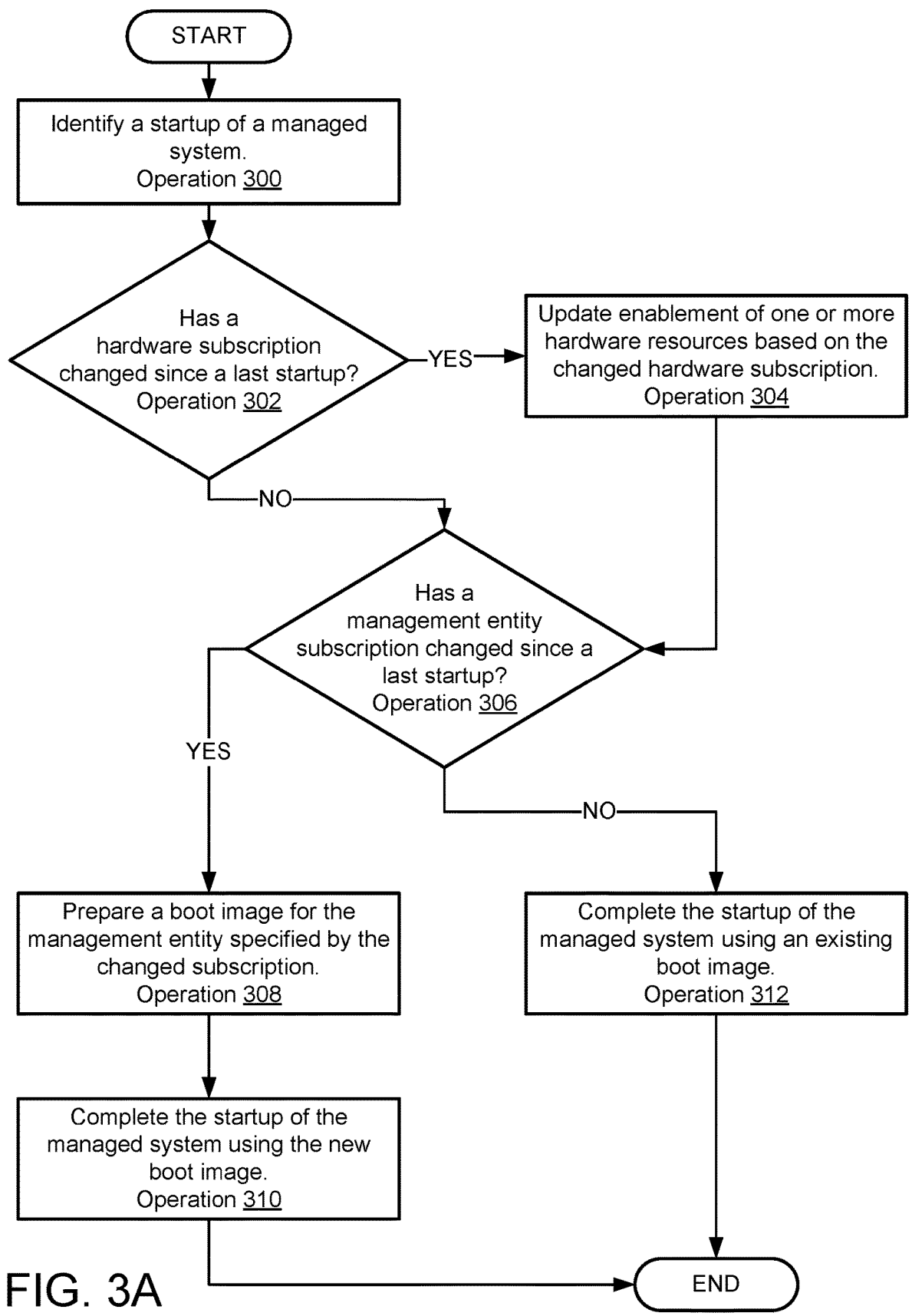
FIG. 3A shows a flow diagram illustrating a method of enforcing subscriptions on a managed system in accordance with an embodiment.

In an embodiment, the updated subscription information repository is enforced using the method illustrated in FIG. 3A. The updated subscription information repository may be enforced using other methods without departing from embodiments disclosed here.

The method may end following operation 208.

Returning to operation 202, the method may proceed to operation 210 following operation 202 when it is determined that the subscription update is not valid.

At operation 210, the subscription update is discarded. Consequently, the subscription information repository may not be updated. In this scenario, discarding the subscription update may keep the host managed system in compliance with subscriptions maintained by the subscription management service whereas implementing the subscription update may place it out of compliance (e.g., one or more hardware components may be in an undesired power state).

The method may end following operation 210.

Using the method illustrated in FIG. 2, a managed system may be placed in a state consistent with a subscription maintained by a subscription management service, and in a state where features added to the managed system may be removed or otherwise reverted automatically upon an occurrence of a subscription limitation being exceeded.

Turning to FIG. 3A, a flow diagram illustrating a method of enforcing compliance with subscriptions in accordance with an embodiment is shown. The method may be performed, in part, by a local subscription manager that previously obtained information regarding a subscription (e.g., a subscription update) for a managed system hosting the local subscription manager.

At operation 300, a startup of the managed system (e.g., a host managed system for the local subscription manager) is identified. The startup may be any process where the managed system goes through a process of identifying its hardware resources, loading various software components, and/or otherwise prepares for/completes handoff of management of the managed system to a management entity such as an operating system.

The startup may be identified by detecting a power cycling and/or power on of the host managed system. The startup may be identified via other methods without departing from embodiments disclosed herein.

In an embodiment, the startup of the managed system is initiated by the local subscription manager. For example, after the updated subscription information repository is obtained as described with respect to FIG. 2, the local subscription manager may initiate startup of the managed system (e.g., regardless of a power state of the host managed system). To do so, the local management system may, for example, send a request, instruction, and/or other information to a management entity that manages operation of the host managed system that indicates that it is to proceed to its startup process (e.g., even if a startup process has been previously successfully completed and the host managed system is operating in an otherwise expected/desirable manner). The startup may be initiated for other purposes (e.g., a user or application initiated restart) and/or via other methods without departing from embodiments disclosed herein.

In an embodiment, when the startup is identified, the local subscription manager interrupts the startup. For example, the normal actions performed during a startup may be temporarily suspended. The startup may be interrupted prior to performance of a portion of the startup where a startup management entity (e.g., a BIOS) makes preparation for handoff to a management entity (e.g., an operating system, drivers, etc.).

At operation 302, a determination is made regarding whether a hardware subscription has been changed since a last startup. The determination may be made, for example, based on the contents of the subscription information policy. For example, the subscription information policy may include a flag (or may be a separate data structure associated with the subscription information repository) which is set automatically when all, or a portion, of its content related to a hardware component (e.g., use authorization) is changed. The determination may be made via other methods without departing from embodiments disclosed herein.

The method may proceed to operation 304 when it is determined that at least one hardware subscription has changed. Otherwise the method may proceed to operation 306 following operation 302.

At operation 304, enablement of one or more hardware resources is updated based on the hardware subscription change. In an embodiment, the enablement is updated by selectively powering and/or depowering the hardware resources, or portions thereof, based on the information included in the (e.g., updated) subscription information repository. The enablement may be updated by, for example, providing a power manager such as a power supply with information regarding which of the hardware resources are to be powered and other hardware resources that are to be depowered. In turn, the power manager may selectively power/depower these hardware resources accordingly.

In an embodiment, the power manager may retain information regarding which hardware resources are to be powered. Consequently, only information regarding changes from previously implemented powering of the hardware resources may need to be provided to the power manager during operation 304.

In an embodiment, the flag in or associated with the subscription information repository regarding hardware subscriptions is reset (e.g., set to indicate no changes) once the enablement of the one or more hardware resources is updated.

At operation 306, a determination is made regarding whether a management entity subscription has been changed since a last startup. The determination may be made, for example, based on the contents of the subscription information policy. For example, the subscription information policy may include a flag (or may be a separate data structure associated with the subscription information repository) which is set automatically when all, or a portion, of its content related to a management entity (e.g., use authorization) is changed. The determination may be made via other methods without departing from embodiments disclosed herein.

The method may proceed to operation 308 when it is determined that the management entity subscription has changed. Otherwise the method may proceed to operation 312 following operation 306.

At operation 308, a boot image for the management entity specified by the changed subscription is prepared. The boot image may be prepared by (i) obtaining a copy of the management entity (e.g., code and/or one or more in-memory data structures), (ii) identify support entities necessary for operation of the management entity, (iii) obtaining copies of the support entities (e.g., code and/or one or more in-memory data structures), and (iv) generating the image using the obtained management entity and support entities.

In an embodiment, the management entity is an operating system. The one or more support entities may include any number of drivers and/or other applications usable to support operation of a management entity. The boot image may be stored in-memory (e.g., of the local subscription manager), stored in storage of the host managed system, and/or in other locations In an embodiment, the boot image is obtained via the method illustrated in and described with respect to FIG. 3B. The boot image may be obtained via other methods without departing from embodiments disclosed herein.

At operation 310, the startup of the managed system may be completed using the new boot image. For example, the startup may be resumed after operation 308 resulting in the computer instructions from the boot image being executed by a process of the host managed system and/or in-memory data structures from the boot image being loaded into memory.

Because some of the hardware resources of the host managed system may not be enabled (e.g., concealed/disguised even though present), the management entity of the host managed system may only become aware of the powered hardware resources. The other hardware resources may be disguised or otherwise hidden from the management entity such that the management entity does not utilize the other hardware resources. Consequently, both hardware components and software components of the host managed system may be managed in this manner through a subscription based model.

The method may end following operation 310.

Returning to operation 306, the method may proceed to operation 312 following operation 306 when it is determined that no management entity subscriptions have changed since a last startup.

At operation 312, the startup of the host managed system is completed using an existing boot image. For example, the startup may be resumed after operation 306 resulting in the computer instructions from the existing boot image being executed by a processor of the host managed system and/or in-memory data structures from the existing boot image being loaded into memory.

Because some of the hardware resources of the host managed system may not be enabled (e.g., concealed/disguised even though present), the management entity of the host managed system (e.g., instantiated by beginning execution of the instructions from the existing boot image) may only become aware of the powered hardware resources. The other hardware resources may be disguised or otherwise hidden from the management entity such that the management entity does not utilize the other hardware resources.

The method may end following operation 312.

Figure 3B:
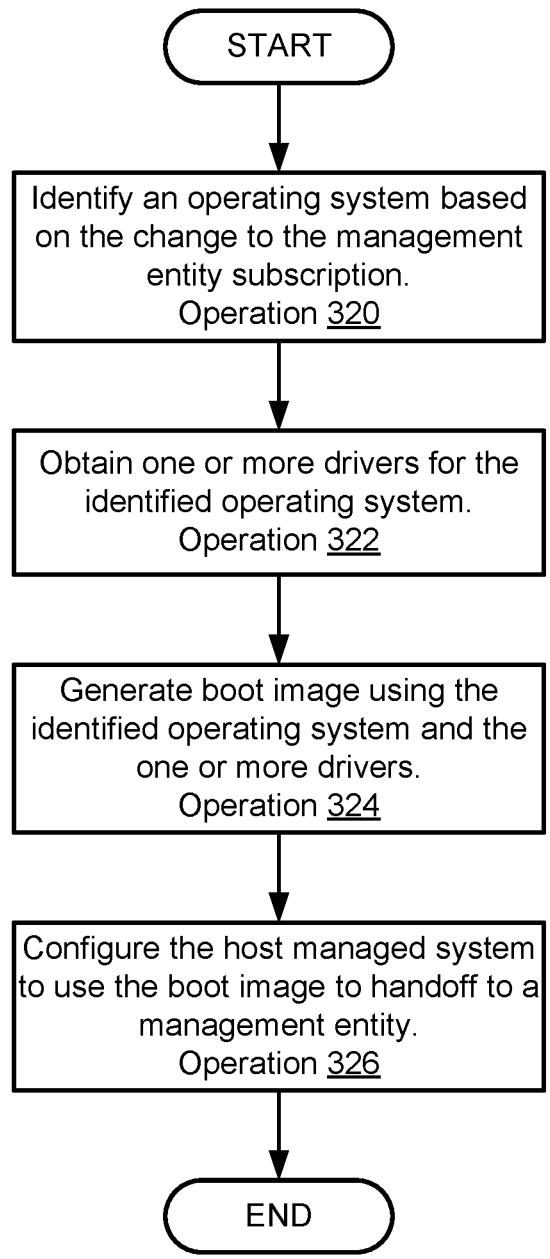
FIG. 3B shows a flow diagram illustrating a method of dynamically obtaining a boot image in accordance with an embodiment.

Turning to FIG. 3B, a flow diagram illustrating a method of preparing a boot image in accordance with an embodiment is shown. The method may be performed, in part, by a local subscription manager that previously obtained information regarding a subscription (e.g., a subscription update) for a managed system hosting the local subscription manager.

At operation 320, an operating system based on the management entity subscription change is identified. The operating system may be identified based on an identifier of the operating system included in the changed management entity subscription.

In an embodiment, a copy of the operating system is retrieved from a management entity service via any method of communication.

At operation 322, one or more drivers for the identified operating system are obtained. The drivers may be obtained by, for example, identifying the drivers based on the hardware resources of the host managed system and identified operating system. Once identified, copies of the drivers may be obtained from the management entity service.

In an embodiment, copies of the one or more drivers are retrieved from the management entity service via any method of communication.

At operation 324, a boot image is generated using the identified operating system and the one or more drivers. For example, the aforementioned copies of the operating system and one or more repositories may be added to a data structure such as a repository to obtain the image. The repository may also include information regarding the process of selecting the operating system and drivers. The repository may also include other types of entities usable to support operation of the operating system such as, for example, translation tables, virtualization services, and/or other entities that may facilitate use of the hardware resources of the hosted managed service by an instantiated copy of the operating system.

At operation 326, the host managed system is configured to use the boot image to handoff to a management entity. For example, an identifier and/or location information for the boot image may be provided/passed to a startup manager that operates the host managed system prior to handoff to the management entity. Doing so may cause the startup process performed by the startup management entity to handoff to an entity defined by the boot image.

The method may end following operation 326.

To further clarify embodiments disclosed herein, diagrams illustrating operation of an example system are shown in FIGS. 4A-4E. Each of these figures may illustrate a block diagram of a system similar to that shown in FIG. 1A as the system operates over time.

Turning to FIG. 4A, example actions and interactions between deployment 400, user device 410, subscription management service 420, managed systems supply 430, and management entity services 440 in accordance with an embodiment are shown. Any of these components may be operably connected to one another via communication system 450. Like named components in these figures and FIG. 1A may be similar.

Deployment 400 may be a datacenter or other type of computing environment that provides desired computer implemented services. A user, that operates user device 410, may be tasked with managing the operation of deployment 400 by managing subscriptions and requesting managed systems from subscription management service 420 and managed systems supply 430.

Now, consider a scenario where the user of user device 410 identifies that the computer implemented services provided by deployment 400 no longer meet responsiveness expectations for lack of hardware resources. In response to the determination, at block 1, the user may utilize user device 410 to send a request to subscription management service 420 for an additional managed system. Based on the request, at block 2, subscription management service 420 selects a managed system that has at least the quantity of hardware resources necessary to meet the needs specified by the user. Once selected, managed systems supply 430 (e.g., a logistics system that manages shipping of various managed systems to various locations, such as deployment 400) prepares and sends the managed system to deployment 400.

While the selected managed system has all of the hardware resources necessary to meet the user's goals, the selected managed systems include additional hardware resources beyond those necessary to meet the user's goals. Further, the selected managed system may be capable of hosting a variety of different management entities allowing for customization and/or configuration of the operation of the managed system. To meet cost goals, subscription management service 420 selects a subscription that results in a particular operating system being deployed to the managed device.

Figure 4B:
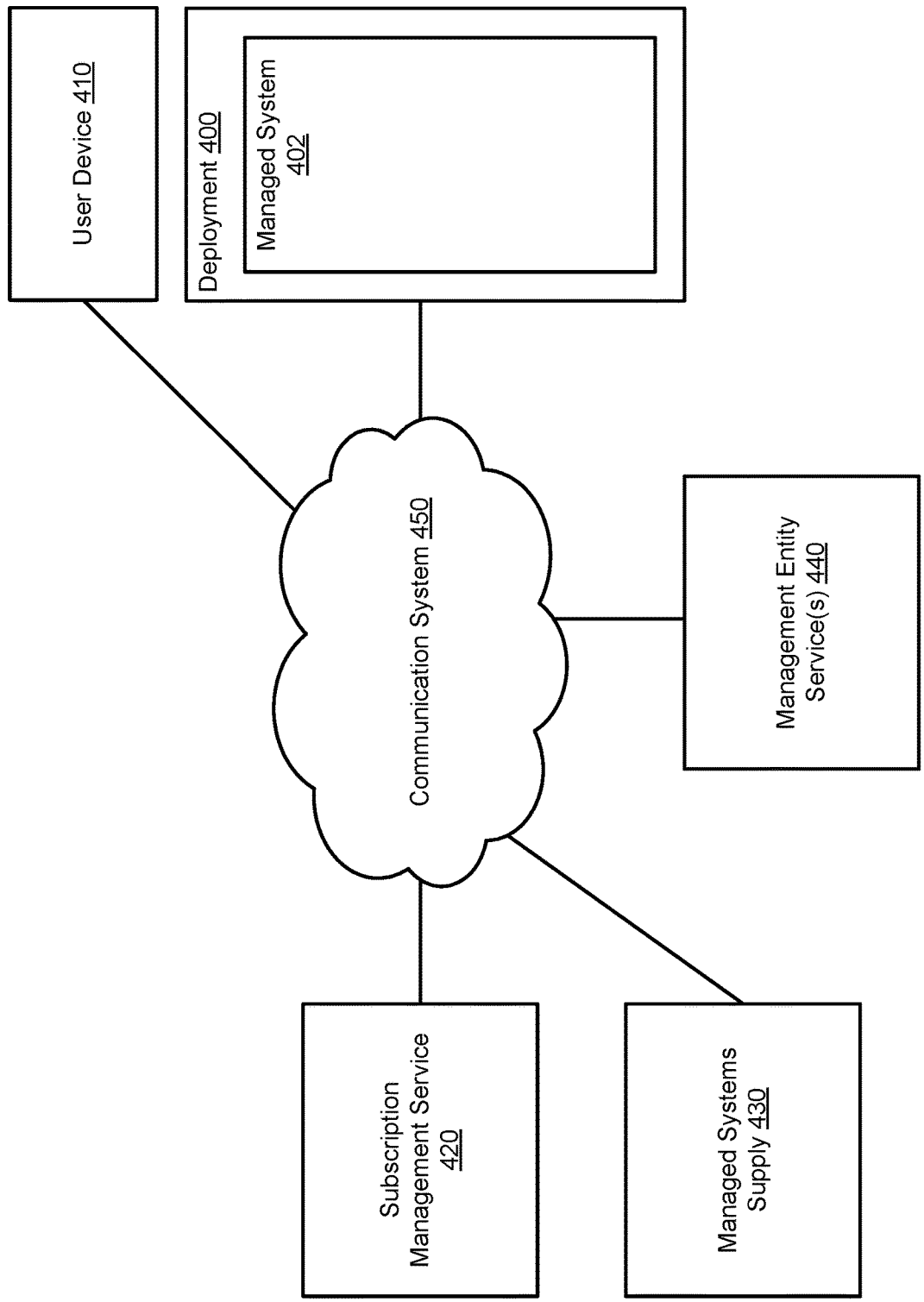

For example, turning to FIG. 4B, managed system 402 may initially be provided without any operating systems. Managed system 402 may be similar to that illustrated in FIG. 1B.

As discussed above, to meet cost goals, subscription management service 420 may have established a first subscription for a particular operating system.

Figure 4C:
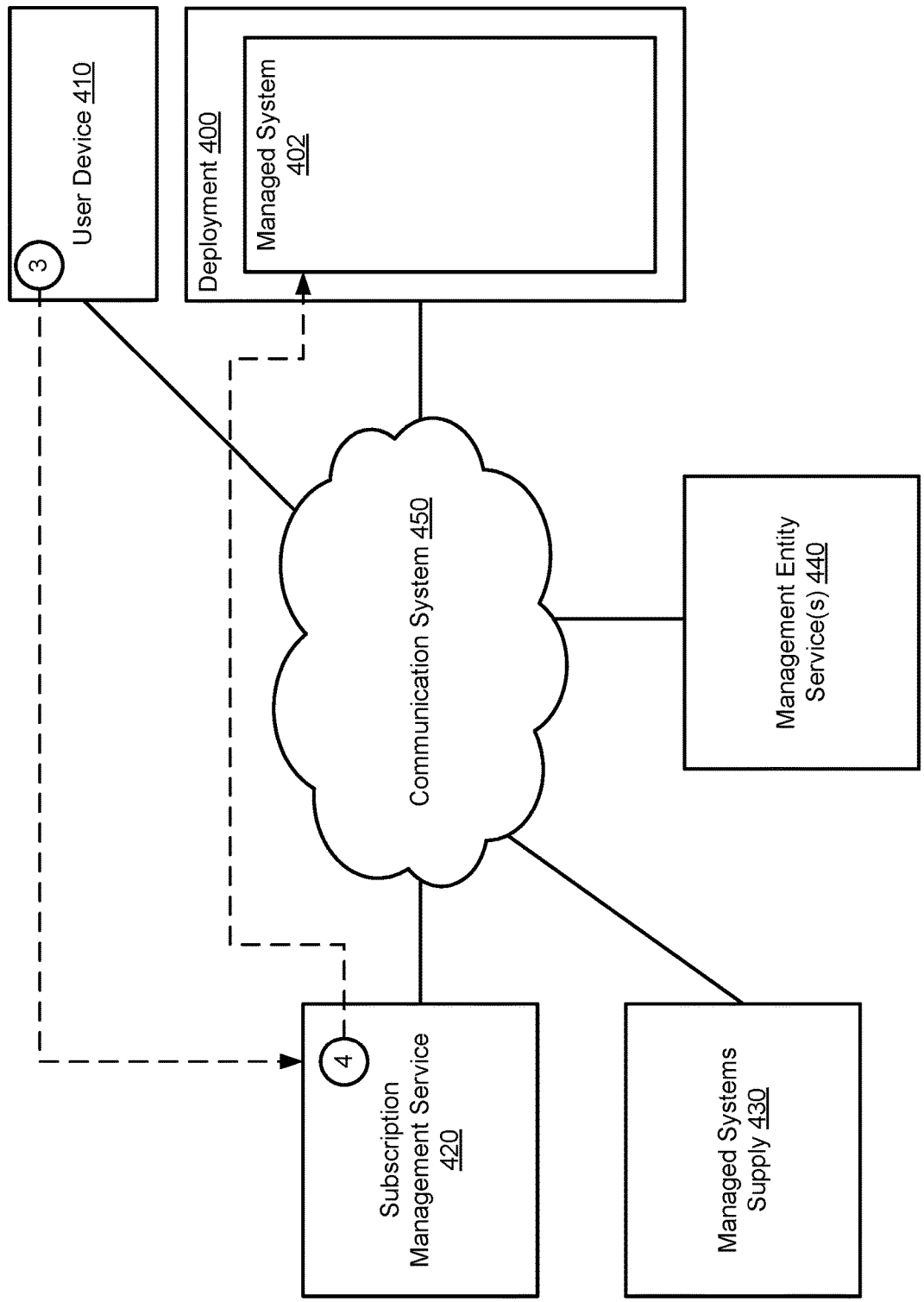

Turning to FIG. 4C, now consider a second point in time following that shown in FIG. 4B where the management needs for performing the computer implemented services change. In response, the user of user device 410 may, at block 3, send a request to subscription management service 420 to modify its management entity subscription for managed system 402 for a different operating system than previously selected and implemented.

In response, the subscription management service 420 may, at block 4, send a subscription update to managed system 402. The subscription update may indicate that managed system 402 is subscribed to a different operating system than previously hosted by managed system 402.

Figure 4D:
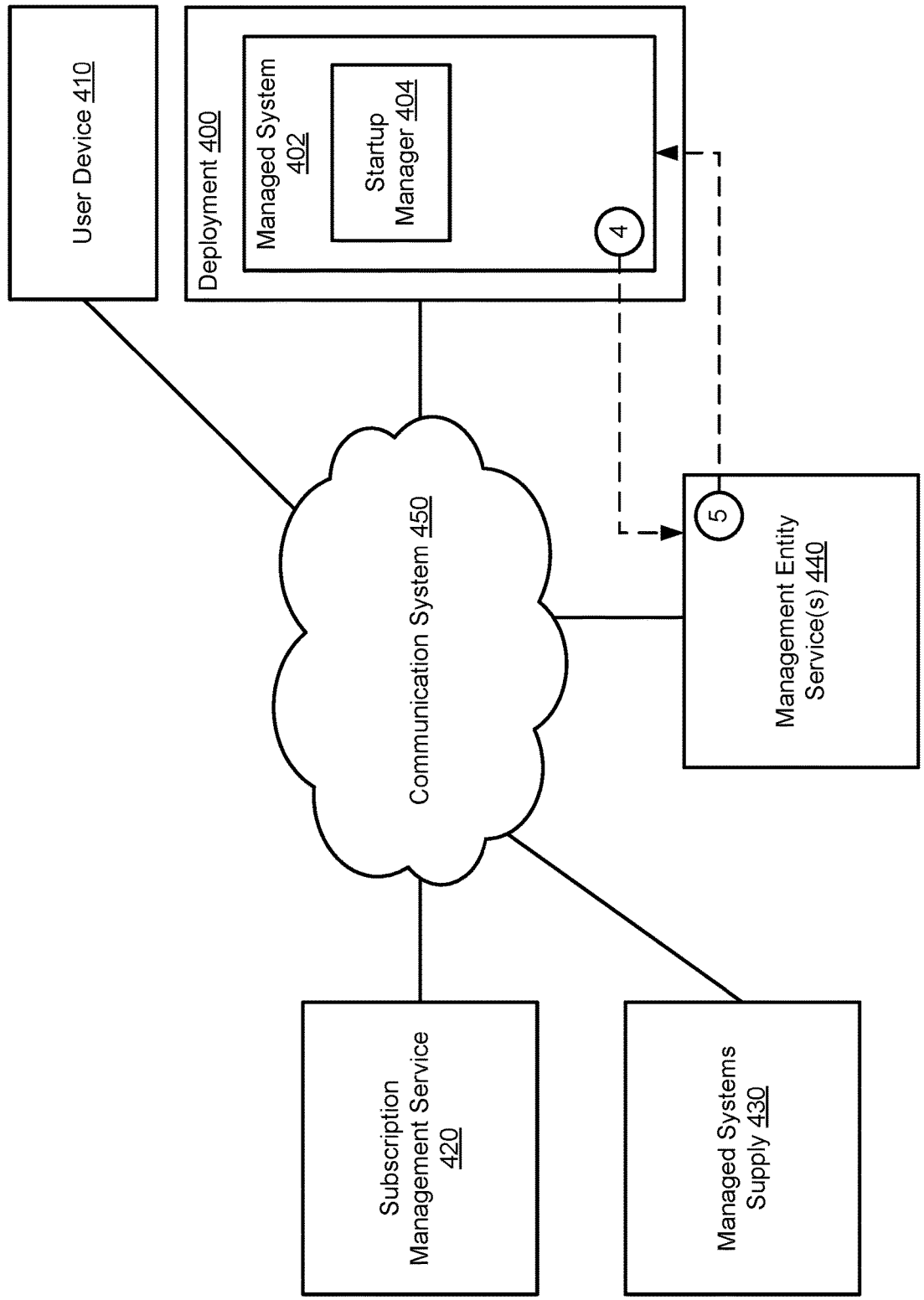

Turning to FIG. 4D, the local subscription managers of managed system 402, at block 4, requests copies of the operating system and drivers necessary to support the operating system. In response, at block 5, management entity services 440 provide copies of the requested operating system and drivers.

Figure 4E:
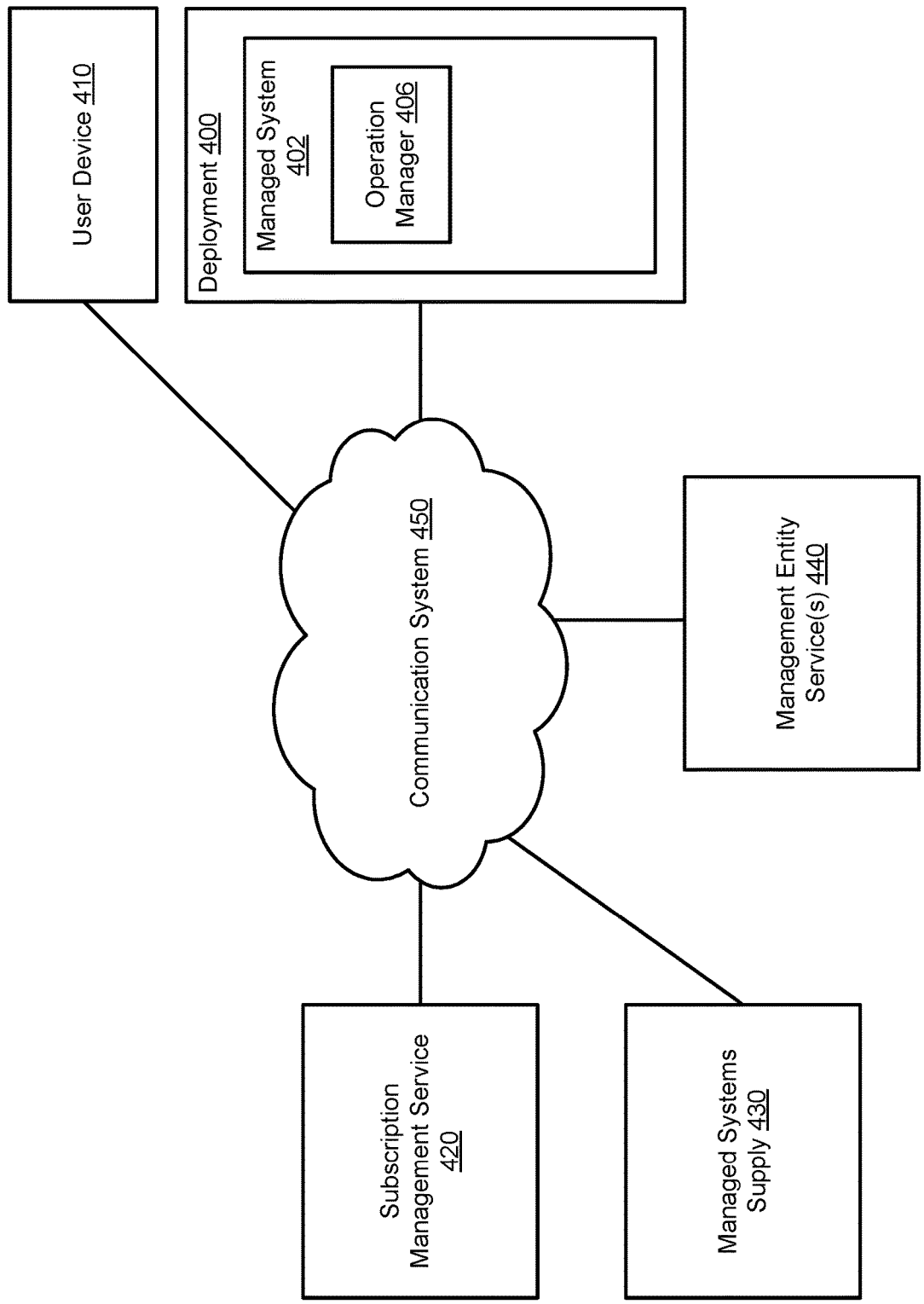

Turning to FIG. 4E, utilizing the copies of the operating system and drivers, the local subscription manager of managed system 402 generates a boot image and causes managed system 402 to boot using the boot image. For example, returning to the discussion of FIG. 4D, a startup manager 404 performing a startup of managed system 402 may be instructed to complete its operation using the boot image. Consequently, returning to the discussion of FIG. 4E, managed system 402 is handed off to an operation manager 406 different from that previously hosted by managed system 402. By doing so, the newly deployed operation manager 406 may facilitate the computer implemented services by providing a new layer through which applications that provided the computer implemented services use hardware resources of managed system 402.

Thus, via the processes illustrated in FIGS. 4A-4E, embodiments disclosed herein may provide for the automatic modification and deployment of operating system, and corresponding support entities such as drivers, to a managed system in accordance with a subscription model.

As part of the aforementioned processes, various subscription updates may be received and processed by local subscription managers of the managed systems.

Figure 5:
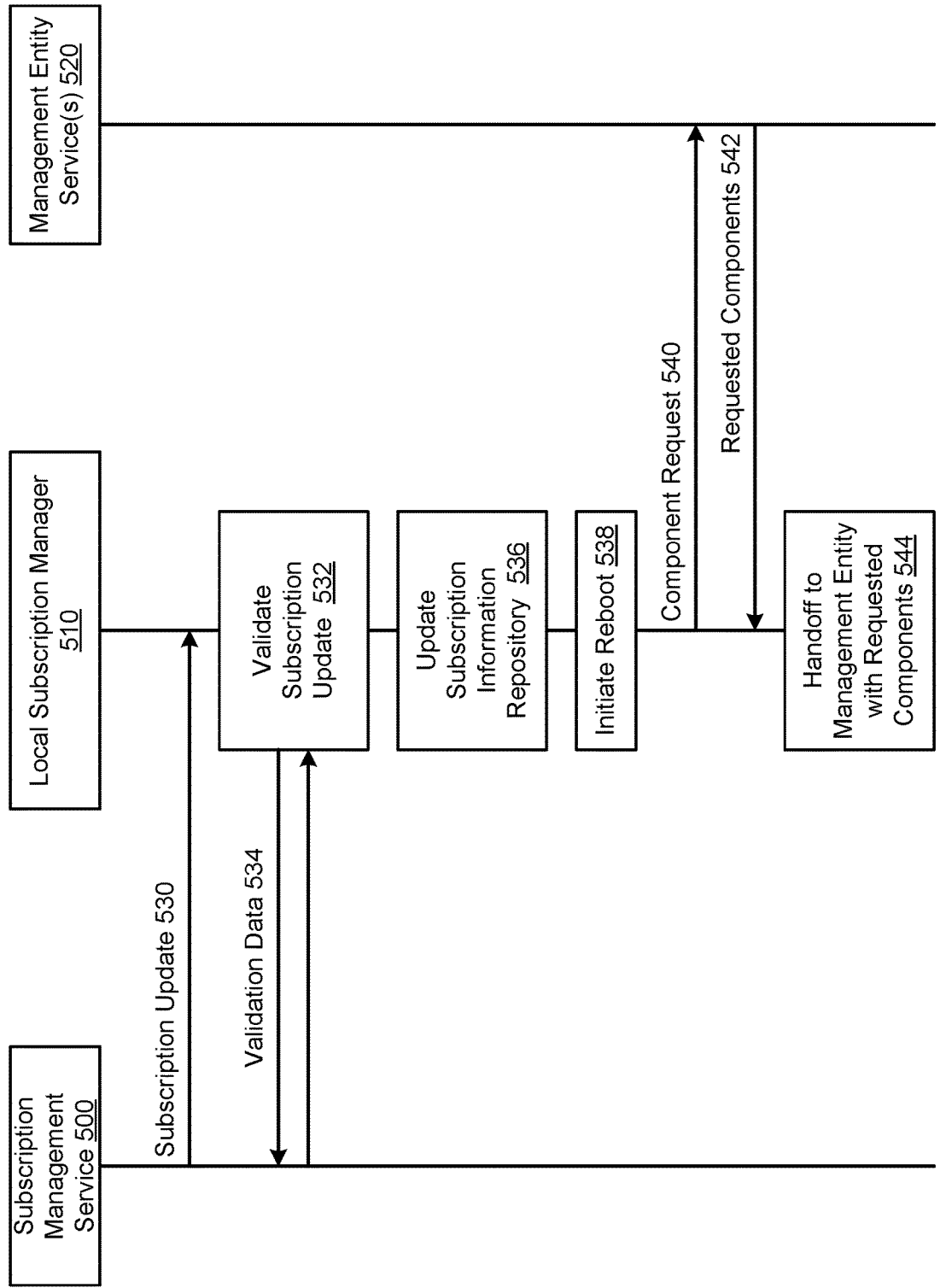
FIG. 5 shows a diagram illustrating interactions between and actions of components of a system in accordance with an embodiment.

Turning to FIG. 5, example actions and interactions between subscription management service 500, local subscription manager 510 of a host managed system (e.g., managed by subscription management service 500), and management entity services 520) in accordance with an embodiment are shown. Like named components in FIG. 5 and FIG. 1A may be similar.

In FIG. 5, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

At block 530, subscription management service 500 generates and provides a subscription update to local subscription manager 510 of a host managed system (not shown, but managed by subscription management service 500). In response, local subscription manager 510, at block 532, performs a validation of the subscription update. To do so, the local subscription manager 510 and subscription management service 500 may exchange validation data with each other, at block 534.

In this example scenario, the exchanged validation data establishes that the subscription update is valid. If it were not validated, local subscription manager 510 may discard the subscription update.

Once validated, local subscription manager 510, at block 536, updates a subscription information repository based on the subscription update. Consequently, the updated subscription information repository may indicate that one or more hardware components of the host managed system that is previously powered or depowered should be depowered or powered, respectively, and/or a different management entity from that previously used to manage operation of the host managed system should be deployed to the host managed system.

Once updated, local subscription manager 510, at block 538, initiates a reboot of the host managed system. Once started, local subscription manager 510 interrupts a startup of the host managed system to send a component request, at block 540, to management entity services 520. The component request may be a request for the components necessary to obtain a boot image such as a copy of an operating system and drivers so that the operating system may utilize the hardware resources of the host managed system.

At operation 542, the requested components are provided to local subscription manager 510. Using the requested components, local subscription manager 510 generates a boot image usable to boot the host managed system.

At block 544, local subscription manager initiates handoff of the host managed system to the management entity with the requested components. For example, local subscription manager 510 may provide a startup management entity with information regarding the boot image usable for it to begin execution of a management entity using the boot image. Consequently, operation of the host managed system may be handed off to the management entity.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

As discussed above, various components may be implemented with computing devices. For example, any of the components illustrated in FIGS. 1A-5 may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for operating a managed system, the method comprising:
    obtaining, by a local subscription manager of the managed system, a subscription update for the managed system;
    making a determination that the subscription update is a valid subscription update;
    in response to the determination:
        updating, by the local subscription manager, a subscription information repository based on the subscription update to obtain an updated subscription information repository, wherein the updated subscription information repository specifies one or more requirements of a management entity to be dynamically composed, and wherein the managed system is to be handed off to the management entity to be dynamically composed during a startup process of the managed system initiated as a result of the subscription update; and
        enforcing, by the local subscription manager, the updated subscription information repository on the managed system by: dynamically composing the management entity to be dynamically composed to obtain a dynamically composed management entity, and initiating execution of the dynamically composed management entity during the startup process of the managed system.

2. The computer-implemented method of claim 1, wherein dynamically composing the management entity to be dynamically composed comprises:
    identifying an existing management entity to be used as a base for the management entity to be dynamically composed based on the updating of the subscription information repository;
    obtaining, based on the identifying, a copy of the existing management entity;
    obtaining one or more support entities for the management entity to be dynamically composed; and
    generating a data structure using the one or more support entities and the copy of the existing management entity.

3. The computer-implemented method of claim 2, wherein initiating execution of the dynamically composed management entity comprises:
    loading, at least in part, a portion of the data structure into memory of the managed system; and initiating execution of a portion of computer instructions stored in the data structure.

4. The computer-implemented method of claim 2, wherein obtaining the one or more support entities comprises:
   requesting at least one of the one or more support entities from a management entity service that is remote to the managed system; and
   receiving an image of the at least one of the one or more support entities via a communication between the local subscription manager and the management entity service.

5. The computer-implemented method of claim 2, wherein the data structure is an image comprising executable computer code and at least one in-memory data structure.

6. The computer-implemented method of claim 5, wherein the executable computer code corresponds to an operating system, and wherein the operating system is the existing management entity that serves as the base of the management entity to be dynamically composed.

7. The computer-implemented method of claim 6, wherein the executable computer code also corresponds to a driver adapted to facilitate use of hardware resources of the managed system by the operating system.

8. The computer-implemented method of claim 1, wherein the management entity to be dynamically composed is dynamically composed before the startup process of the managed system is started.

9. The computer-implemented method of claim 1, wherein the management entity to be dynamically composed is dynamically composed during the startup process of the managed system, and the startup process of the managed system is interrupted during the dynamic composition of the management entity to be dynamically composed.

10. A non-transitory machine-readable medium having instructions stored therein, which when executed by a processor, cause the processor to perform operations for operating a managed system, the operations comprising:
    obtaining, by a local subscription manager of the managed system, a subscription update for the managed system;
    making a determination that the subscription update is a valid subscription update;
    in response to the determination:
        updating, by the local subscription manager, a subscription information repository based on the subscription update to obtain an updated subscription information repository, wherein the updated subscription information repository specifies one or more requirements of a management entity to be dynamically composed, and wherein the managed system is to be handed off to the management entity to be dynamically composed during a startup process of the managed system initiated as a result of the subscription update; and
        enforcing, by the local subscription manager, the updated subscription information repository on the managed system by: dynamically composing the management entity to be dynamically composed to obtain a dynamically composed management entity, and initiating execution of the dynamically composed management entity during the startup process of the managed system.

11. The non-transitory machine-readable medium of claim 10, wherein dynamically composing the management entity to be dynamically composed comprises:
    identifying an existing management entity to be used as a base for the management entity to be dynamically composed based on the updating of the subscription information repository;
    obtaining, based on the identifying, a copy of the existing management entity;
    obtaining one or more support entities for the management entity to be dynamically composed; and
    generating a data structure using the one or more support entities and the copy of the existing management entity.

12. The non-transitory machine-readable medium of claim 11, wherein initiating execution of the dynamically composed management entity comprises:
    loading, at least in part, a portion of the data structure into memory of the managed system; and
    initiating execution of a portion of computer instructions stored in the data structure.

13. The non-transitory machine-readable medium of claim 11, wherein obtaining the one or more support entities comprises:
    requesting at least one of the one or more support entities from a management entity service that is remote to the managed system; and
    receiving an image of the at least one of the one or more support entities via a communication between the local subscription manager and the management entity service.

14. The non-transitory machine-readable medium of claim 11, wherein the data structure is an image comprising executable computer code and at least one in-memory data structure.

15. The non-transitory machine-readable medium of claim 14, wherein the executable computer code corresponds to an operating system, and wherein the operating system is the existing management entity that serves as the base of the management entity to be dynamically composed.

16. A managed system, comprising:
    a processor; and
    a local subscription manager adapted to perform operations for managing operation of the managed system to comply with subscriptions, the operations comprising:
        obtaining, by a local subscription manager of the managed system, a subscription update for the managed system;
        making a determination that the subscription update is a valid subscription update;
        in response to the determination:
            updating, by the local subscription manager, a subscription information repository based on the subscription update to obtain an updated subscription information repository, wherein the updated subscription information repository specifies one or more requirements of a management entity to be dynamically composed, and wherein the managed system is to be handed off to the management entity to be dynamically composed during a startup process of the managed system initiated as a result of the subscription update; and
            enforcing, by the local subscription manager, the updated subscription information repository on the managed system by: dynamically composing the management entity to be dynamically composed to obtain a dynamically composed management entity, and initiating execution of the dynamically composed management entity during the startup process of the managed system.

17. The managed system of claim 16, wherein dynamically composing the management entity to be dynamically composed comprises:
- identifying an existing management entity to be used as a base for the management entity to be dynamically composed based on the updating of the subscription information repository;
- obtaining, based on the identifying, a copy of the existing management entity;
- obtaining one or more support entities for the management entity to be dynamically composed; and
- generating a data structure using the one or more support entities and the copy of the existing management entity.

18. The managed system of claim 17, wherein initiating execution of the dynamically composed management entity comprises:
- loading, at least in part, a portion of the data structure into memory of the managed system; and
- initiating execution of a portion of computer instructions stored in the data structure.

19. The managed system of claim 17, wherein obtaining the one or more support entities comprises:
- requesting at least one of the one or more support entities from a management entity service that is remote to the managed system; and
- receiving an image of the at least one of the one or more support entities via a communication between the local subscription manager and the management entity service.

20. The managed system of claim 17, wherein the data structure is an image comprising executable computer code and at least one in-memory data structure.

\* \* \* \* \*